March 29, 1960     A. BRUEDER     2,930,357
POWER-STEERING DEVICES FOR VEHICLES
Filed April 27, 1955     2 Sheets-Sheet 1
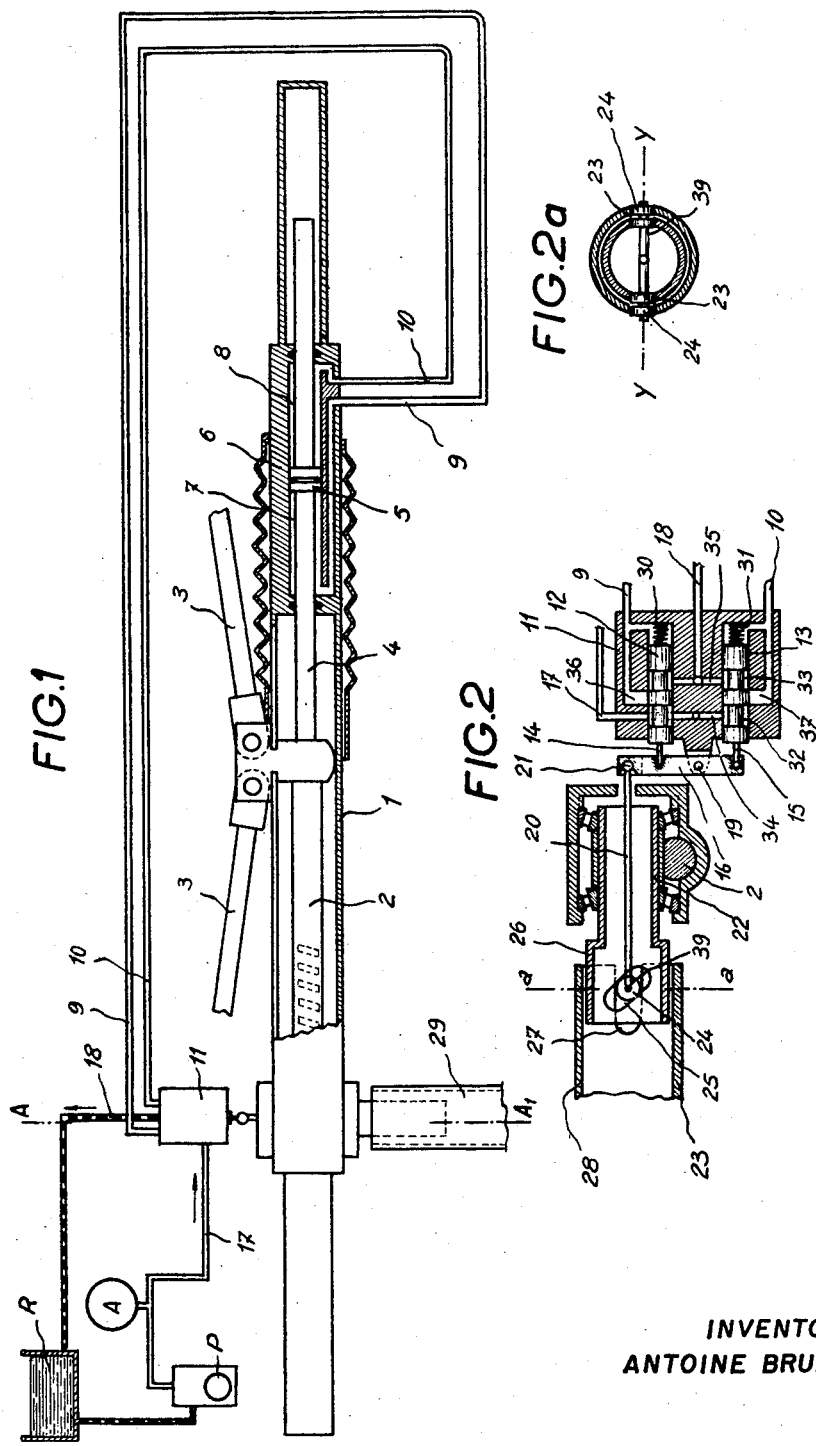
INVENTOR
ANTOINE BRUEDER

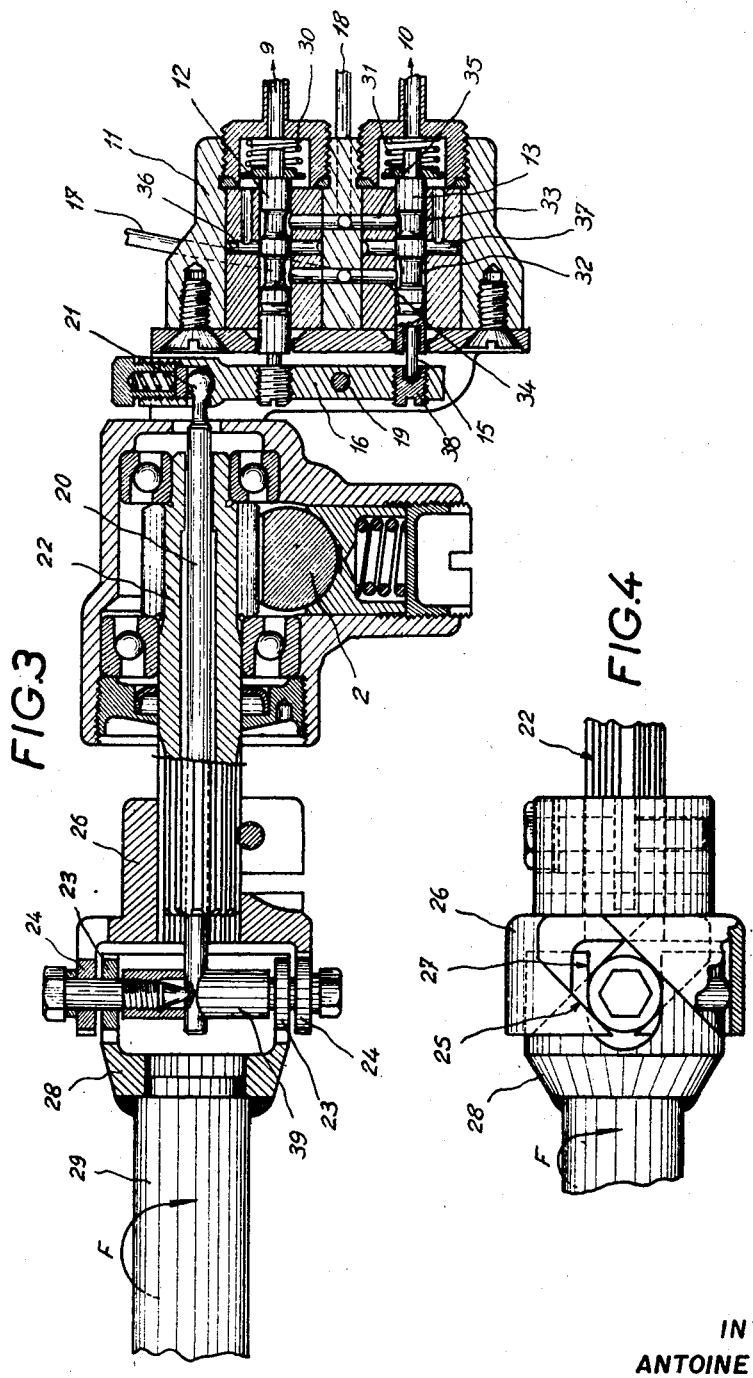

United States Patent Office 2,930,357
Patented Mar. 29, 1960

2,930,357

POWER-STEERING DEVICES FOR VEHICLES

Antoine Brueder, Paris, France, assignor to Societe Anonyme Andre Citroen, Paris, France, a corporation of France Application April 27, 1955, Serial No. 504,309

Claims priority, application France June 30, 1954

4 Claims. (Cl. 121—41)

The present invention relates to a servo-control device for steering vehicles, which comes into action instantaneously and the operative force of which is directly proportional to the control force applied by the driver.

When a fluid under pressure is used to transmit a force in a servo-control device, the volume of fluid to be supplied to execute a certain amount of work is inversely proportional to its pressure. In order to impart a force rapidly in such devices and to reduce passage sections, it is necessary to use high pressures, but nevertheless certain principles of construction must be observed.

It is necessary that the device controlling the distribution of fluid to the cylinders should be very accurate and with minimum friction losses in order to effect very slight displacements of the distributor. Similarly, the dead stroke, that is to say, the displacement of the distributor to move it from the admission position to the exhaust position, must be very small, for example of the order of 2 mm.

The object of the present invention is to provide a power-steering device for vehicles which fulfils the above conditions.

Accordingly the present invention consists in a power-steering device for vehicles comprising two hydraulic slide-valves intended to bring into communication respectively one of the chambers of a cylinder in which moves a piston driving the steering rod system, either with an inlet duct for fluid under pressure or with the return to the tank, said slide-valves being operated by a rocking lever which is itself controlled by a sliding member, the displacement of which is governed by the rotation of the steering column of the vehicle.

Preferably an intermediate transmission device is provided between two of the driving parts of the steering mechanism, for example, the steering column and a pinion or worm, which transforms, without loss of motion, the rotational movement into a linear movement which acts on the rocking lever of the distribution slide-valves.

The driving parts are preferably concentric tubular parts, the intermediate device being constituted by an axle provided with a double pair of rollers and disposed transversely in the steering column, the rollers of one of the pairs being guided in grooves provided in one of the parts, while the rollers of the other pair are guided in grooves formed in the other part and inclined in relation to the grooves in the first part, in such manner that said axle is displaced axially when the two parts have a relative rotational movement, which displacement is utilised to control the distribution rocking lever or hydraulic system; in this manner the steering column or other steering member first acts on the servo-control device before being able to drive the steering mechanically, as would occur if for any reason the servo-control mechanism failed.

Preferably, each of the distributor slide-valves is so constituted that the pressure of the fluid under pressure reacts on the control members and develops a force opposed to that which the driver applies to the steering wheel; if the driver relaxes his effort, the pressure returns the control members to their initial inoperative position.

Further, the invention consists in a particular form of construction of the slide-valves, according to which arrangement each slide-valve in constituted by a rod provided with two cylindrical grooves which remain respectively in communication one with the pressure accumulator and the other with the return to the tank. The length of the cylindrical part comprised between these two grooves being slightly greater than the diameter of the pipe-lines leading to the control cylinder or cylinders, must be obturated by the slide-valve in the position of rest. The position of each slide-valve can be regulated by a stop provided on the rocking lever.

In order that the invention may be more clearly understood, one preferred embodiment thereof will now be described by way of example with reference to the accompanying drawings, in which:

Fig. 1 shows the whole of the installation;

Fig. 2 shows a diagrammatic view in section taken along the line A—A of the double distributor and its control;

Fig. 2a is a section a—a in Figure 2;

Fig. 3 is a more detailed view of the construction of the control device; and

Fig. 4 is an external view of the coupling sleeve serving as control for the double distributor.

In the general arrangement shown in Fig. 1 and in Figs. 2 and 3, there is shown a rack steering gear comprising a body 1 and a rack 2 on which are pivoted tie rods 3 connected to the pivots of the steered wheels.

At the right hand end of the rack is fixed a cylindrical rod 4 provided at its centre with a piston 5 sliding in a cylinder 6 and dividing the latter into two compartments 7 and 8 connected by pipes 9 and 10 to the hydraulic distribution system.

The hydraulic distribution system is constituted by a body 11 in which slide two distributor slide-valves 12 and 13 connected by connecting rods 14 and 15 to a rocking lever 16, and on the other hand a pressure admission pipe 17 leading from a high-pressure hydraulic generator constituted by a tank R, a pump P, and an accumulator A. A return pipe 18 connects the distributor to the tank.

The rocking lever 16 of the slide-valves is pivoted on a pin 19 and is operated by a rod 20 to which it is pivotally connected by a ball joint 21, the rod 20 being adapted to be moved linearly. This rod passes freely axially through a pinion 22 of the rack 2. At the left hand end of this rod is fixed a perpendicular axle 39 having two rollers 23 and two rollers 24 rotatably mounted thereon. The rollers 23 are movably arranged in inclined slots 25 provided in a sleeve 26 which is solid with the pinion 22; the roller 24 can move in longitudinal slots 27 provided in a sleeve 28 solid with a steering column 29.

Depending on the direction of rotation of the steering wheel, the axle 39 is urged towards the left or towards the right in Figure 3 and rocks the rocking lever 16 in one direction or the other through the medium of the rod 20. By this rocking movement, the rocking lever moves one of the slide-valves 12 and 13 towards the right, while the other is moved towards the left under the action of return spring 30 or 31 respectively which are situated at the ends of the slide-valves in the casing.

The slide-valves 12 and 13 are cylindrical parts each provided with two circular grooves 32 and 33. The grooves 32 of the two slide-valves are in communication with one another through the passage 34, which in turn is connected to the pressure accumulator A by the pipe 17; the grooves 33 are in communication with a tank R through the passage 35 and the tube 18. The length of the cylindrical part separating the two grooves 32 and 33 must be of very accurate dimensions, which is also true of the diameter of the orifices 36 or 37 which it obturates in the inoperative position. This length must be slightly greater than the diameter of the holes, by about 2/10 of a millimetre.

The orifices 36 and 37 are in communication on the one hand with the right hand end of the slide-valves (spring end Figure 3) and on the other hand through the medium of the pipes 9 and 10 with the chambers 7 and 8 of the cylinder 6.

In the position of rest, the central part of the two slide-valves must occupy a position which is strictly determined in relation to the holes 36 and 37. To this end, regulation is possible with the aid of the screws 38 (Figure 3) mounted on the rocking lever 16.

Operation is as follows:

When the steering column 29 is rotated in the direction of the arrow F (Figures 3 and 4), the rollers 23 mounted on the axle 39 are moved in the same direction by the slots 27 in the sleeve 28. But the axle 39 has two points of support, through the medium of the rollers 24, on the inclined grooves 25 of the sleeve 26 solid with the steering pinion 22. Because of the inclination of the edge of the slot 25, the axle 39 is urged towards the left in Figures 3 and 4. It carries with it the rod 20 connected by the ball joint 21 to the rocking lever 16. The latter rocks on the pin 19, pushing back the slide-valve 13 to the right, and enables the spring 30 to push the slide-valve 12 towards the left. By this action, the passage 10 is brought into communication with the pressure inlet of the accumulator A through the tube 17 and the passages 34 and 37, while conversely the passage 9 is connected to the exhaust. The pressure is therefore delivered to the chamber 8 of the cylinder 6. At the same time as the pressure increases in the chamber 8, it likewise increases at the right hand end of the slide-valve 13 (spring end), which has the effect of transmitting, through the medium of the connecting rod 15, rocking lever 16, and rod 20, a force opposed to that applied by the driver to the steering wheel.

There is therefore constantly an equilibrium between the force supplied by the driver and the pressure acting on the control piston of the rack which controls the track rods 3 connected to the wheel pivots. If the driver relaxes his force, the pressure which is applied at the end of the slide-valve 13 pushes back the same into its inoperative position and returns the axle 39 to its initial position, i.e. the arrangement is self-centering.

This servo-steering arrangement as a whole differs from systems at present in use in the following respects:

The longitudinal displacement of the hydraulic control slide-valve is effected by transforming the relative angular displacement of the steering column and of the steering control pinion into a longitudinal displacement by the utilisation of an axle perpendicular to the axis of the steering column, and having four rollers which move in slots which are suitably inclined relatively to one another.

Known devices make direct use, as a general rule, of the longitudinal displacement of certain parts of the steering mechanism. For example: the longitudinal displacement of the worm controlling the steering segment, or else the linear movement of a track bar.

These processes have the disadvantage of using the displacement of members which, since they have to transmit considerable forces, necessarily have rather large dimensions, and the frictions which they generate are prejudicial to precision of control.

The control device which has just been described permits great precision in the movement of the slides (about 1/10 of a millimetre), which precision would not be possible with devices in use hitherto.

In the majority of servo-steering arrangements at present in use, the hydraulic distribution is effected by a single slide valve of large diameter and the pressure is obtained by constricting the circuit of a pump, this constriction being effected by more or less complete closure of the return passage by the slide-valve itself.

The pressures utilised in these previous appliances are relatively low, and the passage sections required are therefore large and the volume to be displaced considerable. This leads to the necessity of having relatively large angular displacements of the steering wheel in order to obtain the desired action.

The use of accumulated high pressures permits reduction of the necessary displacements and an increase in rapidity of action.

I claim:

1. In a power-steering device for vehicles having a steering-column, rack and pinion, steering-rod system with a fluid-operated double-acting jack having a cylinder, a piston therein to drive said steering-rod system, a double fluid-distributor device having two slide-valves, piping means connecting each extremity of said cylinder to one of said slide-valves; a source of fluid under pressure, piping means connecting said source to said distributor the combination comprising means for simultaneously actuating said slide-valves in opposite directions, said last named means including a rocking lever, means associated with said steering-column for converting its rotational movement to linear motion, means for transmitting said linear motion to one extremity of said rocking lever, whereby a small degree of rotation of the steering-wheel causes one slide valve to be moved to a position in which pressure fluid passes to one side of said cylinder, while the other slide-valve is moved in the opposite direction to connect the other side of said cylinder to exhaust, said means for transmitting linear motion to said rocking lever comprising a rod concentric with said steering-column and a sleeve fast with a driving pinion of said steering mechanism, said rod having a transverse shaft, a double pair of rollers on said shaft, said steering-column having diametrically-opposite slots for guiding one of said pairs of rollers and said sleeve having diametrically-opposite slots for guiding the other pair of rollers, said two sets of slots being inclined relative to one another so that said shaft and rod are subjected to a linear displacement when said steering-column rotates with respect to said sleeve.

2. In a device as claimed in claim 1 wherein said slide-valves of said distributor device are so formed that the pressure of the fluid applied to actuate said steering-rod system through the medium of said jack, reacts through said rocking lever and said linear motion transmitting means, with a force acting opposite to the manual force applied to said steering-column so that said manual force and the force applied to the piston of said jack are in constant equilibrium.

3. In a device as claimed in claim 1 wherein each of said slide-valves comprises a rod having two cylindrical grooves which remain respectively in communication with said source of pressure in one position, and with the return to exhaust in the other position, the length of the cylindrical portion comprised between said two grooves being slightly greater than the diameter of the piping leading to said cylinder.

4. In a device as claimed in claim 1 wherein means are provided for independently adjusting the travel of each of said slide-valves under the action of said rocking lever, said means comprising regulatable screw-stop members associated with the actuating rods of said slide-valves.

References Cited in the file of this patent

UNITED STATES PATENTS

| | | |
|---|---|---|
| 475,455 | Lavinia | May 24, 1892 |
| 657,168 | Lane et al. | Sept. 4, 1900 |
| 691,692 | Von Zweigbergk | Jan. 21, 1902 |
| 965,270 | Zelle | July 26, 1910 |
| 1,467,209 | Sumner | Sept. 4, 1923 |
| 2,053,301 | Russell | Sept. 8, 1936 |
| 2,321,377 | French | June 8, 1943 |
| 2,380,705 | Proctor | July 31, 1945 |
| 2,635,582 | Zeilman | Apr. 21, 1953 |
| 2,650,669 | Hammond | Sept. 1, 1953 |
| 2,654,347 | Clark | Oct. 6, 1953 |
| 2,688,258 | Haynes | Sept. 7, 1954 |
| 2,857,976 | Forster et al. | Oct. 28, 1958 |

FOREIGN PATENTS

| | | |
|---|---|---|
| 636,500 | Germany | Oct. 10, 1936 |